United States Patent [19]

Parker

[11] 4,071,486

[45] Jan. 31, 1978

[54] EPOXIDE THERMAL STABILIZATION ADDITIVE FOR POLYPYRROLIDONE

[75] Inventor: Phillip H. Parker, San Rafael, Calif.

[73] Assignee: Chevron Research Company, San Francisco, Calif.

[21] Appl. No.: 752,502

[22] Filed: Dec. 20, 1976

[51] Int. Cl.² .............................................. C08J 3/20
[52] U.S. Cl. ............................ 260/18 N; 260/18 PF; 260/45.8 A; 260/30.4 N; 260/78 P
[58] Field of Search .............. 260/78 P, 45.8 A, 18 N, 260/18 PF, 30.4 N

[56] References Cited

U.S. PATENT DOCUMENTS

| | | | |
|---|---|---|---|
| 2,996,474 | 8/1961 | Voight | 260/45.8 A |
| 3,017,393 | 1/1962 | Ney, Jr. | 260/78 |
| 3,052,654 | 9/1962 | Roth et al. | 260/78 |
| 3,406,140 | 10/1968 | Polestak et al. | 260/45.8 A |
| 3,721,652 | 3/1973 | Barnes | 260/78 P |
| 3,948,832 | 4/1976 | Hudgin | 260/45.8 A |

*Primary Examiner*—Eugene C. Rzucidlo
*Attorney, Agent, or Firm*—D. A. Newell; T. G. DeJonghe; L. S. Squires

[57] ABSTRACT

Alkyl epoxides are thermal stabilization additives for normally solid polypyrrolidone at melt temperatures.

16 Claims, No Drawings

EPOXIDE THERMAL STABILIZATION ADDITIVE FOR POLYPYRROLIDONE

BACKGROUND OF THE INVENTION

Poly-2-pyrrolidone is the source of a useful synthetic fiber for the textile industry. The melt-spinnable white solid polymer is produced by the alkaline-catalyzed polymerization of 2-pyrrolidone in the presence of carbon dioxide (see U.S. Pat. No. 3,721,652). Polypyrrolidone so-produced is melt-spun into filaments by extrusion from multi-hole spinnerets. In meltspinning, the polymer composition is extruded in a molten condition at a melt temperature which is generally greater than about 270° C. The extrusion must be carried out with care because of the tendency of the polymer to thermally degrade and revert to monomer. Degradation produces an unacceptable extrudate containing foam or bubbles. If extrusion is attempted to an appreciably lower temperature to avoid thermal decomposition, fibers of lower tensile strength are produced. Consequently, in order to melt extrude polypyrrolidone efficiently, one may either seek to increase the thermal stability of the polymer, or to improve the extrudability of the polymeric composition.

SUMMARY OF THE INVENTION

The thermal stability of poly-2-pyrrolidone at melt temperature is appreciably improved by the addition of alkyl epoxide. The poly-2-pyrrolidone composition comprises a major amount of normally solid poly-2-pyrrolidone and a thermal stabilizing amount of an alkyl epoxide. An improved method of melt extrusion utilizes said composition to provide for the continuous extrusion of poly-2-pyrrolidone at extrusion melt temperatures in the range of about 260°–280° C.

DESCRIPTION OF PREFERRED EMBODIMENTS

A useful synthetic fiber is produced by the melt extrusion at melt temperatures in the range of about 260°–280° C, preferably less than 275° C, and most preferably below about 270° C, of a composition comprising a major amount of polypyrrolidone and a minor amount of an alkyl epoxide.

The alkyl epoxides of the present invention are alkyl compounds whose principal functionality for the purpose of this invention is one or more oxirane or oxetane rings, preferably an alkyl epoxide of the general formula:

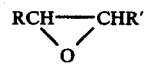

wherein R is hydrogen, alkyl or epoxyalkyl and R' is alkyl, polyalkylene oxide, epoxyalkyl, epoxypolyalkyl oxide, alkylester, epoxyalkylester, hydroxyalkyl, or hydroxyalkylester. The alkyl epoxide preferably contains less than about 60 carbon atoms. The "alkyl" of the alkyl substituents R and R', of the epoxyalkyl, of the alkylesters, etc., is a lower or higher alkyl of less than 60 carbon atoms encompassing all the geometric and substitutional isomers in the 60 carbon atom alkyl class such as, methyl, ethyl, propyl, isopropyl, butyl, isobutyl, t-butyl, hexyl, nonyl, dodecyl, pentadecyl, octadecyl, eicosyl, pentacosyl, triacontyl, etc., as permitted by these functionalities. When R' is alkyl, the alyl epoxides are epoxyalkanes, such as, epoxyoctadecane, epoxypentacosane, etc., preferably, 1,2-epoxyalkanes, such as those produced by the epoxidation of alpha-olefins. The "polyalkylene oxide" of the polyalkylene oxide substituent and the epoxy polyalkylene oxide, is preferably a polyethylene or polypropylene oxide of less than about 60 carbon atoms. The epoxypolyalkylene oxide is an epoxide-terminated polyalkylene oxide substituent, in which case the preferred alkyl epoxide is commonly called a "polyalkyleneglycol diepoxide" or "polyglycol diepoxide". The "epoxyalkyl" of the epoxyalkyl substituent and the epoxyalkylester encompasses the aforementioned alkyl but has at least one oxirane ring functionality. The "epoxyalkyl" may contain a small but appreciable amount of unepoxidized, nonaromatic, unsaturation due to incomplete epoxidation of the olefinic precursors. This unsaturation is insignificant. The "alkylester" of the alkylester substituent, the epoxyalkylester and the hydroxyalkylester may be a mono-, di-, or polyester moiety, such that the alkyl epoxide of this invention is an epoxidized mono-, di-, or polyester. Preferably, it is a mono-, di- or triester. The alkylester has fewer than about 60 carbon atoms. For example, such esters will include, epoxymethyloleate, epoxyhexyllinoleate, and epoxyoleic acid mono-, di-, or triglyceride; also glycidide-type esters, such as esters of glycidol; and hydroxyesters such as, epoxyrincinoleate; and epoxidized esters of fatty acids or mixtures of esters of epoxidized fatty acids, including the glycerides such as, epoxidized soybean oil, epoxidized linseed oil, epoxidized sunflower oil, etc. Epoxidized esters of $C_{16}$–$C_{20}$ fatty acids and $C_1$–$C_{10}$ alkanols are a preferred class of alkyl epoxide. Minor amounts of saturated fatty acid glycerides, such as, stearates and palmitates are also present in the naturally occurring glycerides, but these are not believed to offer a material advantage of disadvantage to the invention. The "hydroxyalkyl" substituents, including epoxyhydroxyalkyl substituents, are limited to fewer than about 60 carbon atoms and preferably encompasses mono-, di- and trihydroxyalkyl or epoxyalkyl groups. The alkyl epoxides of this invention will normally have an oxirane oxygen content of from about 2–5 percent up to about 10–15 percent by weight. These alkyl epoxides are known compounds or are synthesized by known methods well within the skill of workers in the chemicals arts.

The melt extrusion of normally solid poly-2-pyrrolidone is improved by the inclusion of a thermal stabilizing amount, or an extrusion-assisting amount of the alkyl epoxide. Such amounts of alkyl epoxide are minor amounts based on polypyrrolidone, ranging from about 0.1 weight percent to about 10–15 weight percent, preferably about 0.1–1 weight percent. The melt extrusion may be improved either by an appreciable lowering of the melt extrusion temperature due to the addition of the alkyl epoxide, or by reduction in the rate of monomer formation at the melt temperature, with the production of fibers of good tensile strength. The improvement is evidenced by a continuous extrusion of the filamentary poly-2-pyrrolidone composition at melt temperatures in the range 260°–280° C and preferably less than about 270°–275° C, without breaks, dripping, foam or bubbles, using ordinary commercial spinning equipment known to the synthetic textile art.

The "normally solid" poly-2-pyrrolidone of the present invention is polypyrrolidone having a weight average molecular weight in excess of about 5000 and preferably in excess of about 50,000. The alkyl epoxide is normally added to the solid polypyrrolidone by coating pellets of the polymer with the alkyl epoxide before extrusion, or by pelletizing the polypyrrolidone resin with added alkyl epoxide, but any convenient method may be used.

Thermal stabilization is determined, among other methods, by the measurement of weight loss by the polypyrrolidone polymer on a Mettler FP-1 hot stage at 269° C over a period of five minutes, with and without the presence of the alkyl epoxide. The monomer produced by this heat treatment is completely removed by extraction with water. The difference in weight between the starting polymer and the thermally treated dry extracted polymer is the weight loss. The alkyl epoxide of the present invention produces an average decrease in weight loss of more than about 10 weight percent in this test, as shown in the following Table I containing average values of several test runs in several examples.

TABLE I

| Ex. No. | Additive | Conc. Wt. % | Decrease in Weight Loss, % |
|---|---|---|---|
| 1 | Epoxidized Soybean Oil | 0.3 | 22 |
| 2 | Epoxidized Soybean Oil | 0.5 | 20 |
| 3 | Epoxidized Soybean Oil | 1.0 | 20 |
| 4 | Epoxidized Soybean Oil | 2.0 | 21 |
| 5 | Epoxidized Soybean Oil | 3.0 | 16 |
| 6 | Epoxidized Soybean Oil | 5.0 | 10 |
| 7 | Epoxidized Linseed Oil | 1.0 | 15 |
| 8 | Epoxidized Linseed oil | 1.0 | 26 |
| 9 | Epoxidized Linseed Oil | 3.0 | (increase) |
| 10 | Epoxidized Octyl Tallate | 3.0 | 8 |
| 11 | Epoxidized Octyl Stearate | 3.0 | (increase) |
| 12 | Epoxidized Monoester | 0.5 | 24 |
| 13 | Epoxidized monoester | 1.0 | 12 |
| 14 | 1,2-Epoxyoctadecane | 0.5 | 24 |
| 15 | 1,2-Epoxyoctadecane | 1.0 | 25 |
| 16 | Epoxidized polyalkylene oxide | 0.3 | 10 |
| 17 | Epoxidized polyalkylene oxide | 1.0 | 25 |
| 18 | Epoxidized polyalkylene oxide | 3.0 | 28 |

Aromatic epoxides are unepoxidized compounds, otherwise corresponding to the compounds of Table I, are generally found to produce no decrease in weight loss or an actual increase in weight loss in the thermal stabilization test. (See Table II.)

TABLE II

| No. | Additive | Conc. Wt. % | Decrease in Weight Loss, % |
|---|---|---|---|
| 1 | Diglycidyl Ether of Bisphenol A | 1.0 | (increase) |
| 2 | Diglycidyl Ether of Phenol Formaldehyde (Novolac) | 1.0 | (increase) |
| 3 | Phenyl Glycidyl Ether | 1.0 | (increase) |
| 4 | Polyethylene Glycol (MW about 550) | 1.0 | (increase) |
| 5 | Polyethylene Glycol (MW about 3350) | 1.0 | (increase) |
| 6 | Polypropylene Glycol | 1.0 | 0 |
| 7 | Methoxypolyethylene Glycol | 1.0 | 0 |

What is claimed is:

1. A composition of matter comprising a major amount of normally solid poly-2-pyrrolidone and a thermal stabilizing amount, effective to reduce the thermal degradation of said poly-2-pyrrolidone to its monomer, of an alkyl epoxide, containing less than about 60 carbon atoms, of the formula

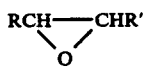

wherein R is hydrogen, alkyl or epoxyalkyl and R' is alkyl, polyalkylene oxide, epoxyalkyl, epoxypolyalkyl oxide, alkylester, epoxyalkylester, hydroxyalkyl or hydroxyalkylester.

2. A composition of matter according to claim 1 wherein R is hydrogen, alkyl or epoxyalkyl and R' is polyalkylene oxide or epoxypolyalkylene oxide.

3. A composition of matter according to claim 1 wherein R is hydrogen, alkyl or epoxyalkyl and R' is alkyl or epoxyalkyl.

4. A composition of matter according to claim 1 wherein R is hydrogen, alkyl or epoxyalkyl and R' is alkylester or epoxyalkylester.

5. A composition of matter according to claim 1 wherein R is hydrogen, alkyl or epoxyalkyl and R' is hydroxyalkyl or hydroxyalkylester.

6. A composition of matter comprising a major amount of a normally solid poly-2-pyrrolidone and a minor amount of an epoxyalkane, containing less than about 60 carbon atoms, effective to reduce the thermal degradation of said poly-2-pyrrolidone to it monomer.

7. A composition of matter comprising a major amount of normally solid poly-2-pyrrolidone and a minor amount effective to reduce the thermal degradation of said poly-2-pyrrolidone to its monomer of an epoxidized ester, of a fatty acid, containing less than about 60 carbon atoms.

8. A composition of matter according to claim 7 wherein said epoxidized ester comprises the epoxidized esters of oleic and/or linoleic acids.

9. A composition of matter according to claim 7 wherein said epoxidized ester is an epoxidized ester of a $C_{16}$–$C_{20}$ fatty acid and $C_1$–$C_{10}$ alkanol.

10. A composition of matter according to claim 7 wherein said acid is selected from oleic and linoleic acids and said alkanol is glycerol.

11. A method of melt extruding normally solid polypyrrolidone comprising admixing a thermal-stabilizing amount effective to reduce the thermal degradation of said poly-2-pyrrolidone to its monomer of an alkyl epoxide, containing less than about 60 carbon atoms, of the formula

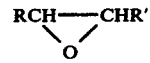

wherein R is hydrogen, alkyl or epoxyalkyl and R' is alkyl, polyalkylene oxide, epoxyalkyl, epoxypolyalkyl oxide, alkyl ester, epoxyalkyl ester, hydroxy alkyl or hydroxy alkyl ester, with said polypyrrolidone to form a mixture, and extruding said mixture at a melt temperature in the range of about 260°–280° C.

12. The method of claim 11 wherein said mixture is extruded at a melt temperature below about 275° C.

13. The method of claim 11 wherein said mixture is extruded at a melt temperature below about 270° C.

14. The composition of claim 1 wherein said composition contains about from 0.1 to 1 percent by weight, based on the weight of said poly-2-pyrrolidone, of said alkyl epoxide.

15. The composition of claim 9 wherein said composition contains from about 0.1 to 1 percent by weight, based on the weight of said poly-2-pyrrolidone, of said epoxidized ester.

16. The method of claim 11 wherein said polypyrrolidone contains from about 0.1 to 1 percent by weight, based on the weight of said polypyrrolidone, of said alkyl epoxide.

* * * * *

UNITED STATES PATENT AND TRADEMARK OFFICE
CERTIFICATE OF CORRECTION

PATENT NO. : 4,071,486
DATED : January 31, 1978
INVENTOR(S) : Phillip H. Parker

It is certified that error appears in the above-identified patent and that said Letters Patent are hereby corrected as shown below:

Col. 3, line 28, "Example 7, Conc. Wt. %, 1.0" should read --0.5--.

Col. 4, line 61, "from about" should read --about from--.

Col. 4, line 65, "from about" should read --about from--.

Signed and Sealed this

Sixteenth Day of May 1978

[SEAL]

Attest:

RUTH C. MASON
Attesting Officer

LUTRELLE F. PARKER
Acting Commissioner of Patents and Trademarks